United States Patent

[11] 3,607,539

| [72] | Inventor | Romil Tonisberg<br>Bromolla, Sweden |
|---|---|---|
| [21] | Appl. No. | 887,788 |
| [22] | Filed | Dec. 23, 1969 |
| [45] | Patented | Sept. 21, 1971 |
| [73] | Assignee | Aktiebolaget Ifoverken<br>Bromolla, Sweden |
| [32] | Priority | Jan. 3, 1969 |
| [33] | | Sweden |
| [31] | | 43/69 |

[54] METHODS OF MANUFACTURING FACING PANELS
3 Claims, No Drawings

[52] U.S. Cl. .................................................... 156/276, 156/62.2, 156/279
[51] Int. Cl. ....................................................... B32b 31/06
[50] Field of Search ........................................... 156/62.2, 70, 246, 276, 278, 279, 324; 161/87

[56] References Cited
UNITED STATES PATENTS

| 2,748,019 | 5/1956 | Schramm, Jr. ............... | 156/276 X |
| 2,759,522 | 8/1956 | Limm .......................... | 156/276 X |
| 3,271,215 | 9/1966 | Hoffman ...................... | 156/276 X |
| 3,499,820 | 3/1970 | DeSaulniers ................ | 156/276 X |
| 3,511,731 | 5/1970 | Raynal ........................ | 156/247 X |

*Primary Examiner*—Benjamin R. Padgett
*Assistant Examiner*—S. R. Hellman
*Attorney*—Karl W. Flocks ABSTRACT: A novel method of manufacturing decorative facing panels comprises continuously applying the materials of the panels to a continuously moving supporting foil. To begin with, a layer of reinforcing material is applied to the supporting foil and impregnated with resin, and on top of this layer there is placed a sand layer, whereupon another layer of reinforcing material is applied and impregnated with resin. Finally, the decorative layer is placed in the uppermost layer of reinforcing material.

METHODS OF MANUFACTURING FACING PANELS

This invention relates to a method of manufacturing facing panels and the like consisting of a glass-fiber-reinforced body or resin and filler, and a decorative layer on the body, for instance a mineral layer partly embedded in said body.

Conventional facing panels of this type are manufactured by placing the different materials one after the other in a mold which has first been treated with a mold release agent. After supply of the decorative layer which normally consists of crushed mineral such as granite, marble etc., curing is performed, usually while pressure is exerted upon the layers.

The panels thus made suffer from several drawbacks. The manufacture which is substantially manual despite the use of mechanical means, yields an expensive product. Moreover, certain panels are thick and very heavy and thus difficult to handle. Other panels are characterized by poor mechanical solidity and a tendency of splitting.

For the manufacture of high-quality panels of this type at a low price, first of all the manual phases of the manufacture have to be eliminated and the manufacture has to take place continuously with automatic dosing and spreading of the different layers. To keep the costs low the resin quantity must be kept as low as possible and besides use must be made of cheaper reinforcing materials than the glass fiber fabric hitherto employed.

The method of the invention is characterized by applying to a continuously moving supporting foil a first layer of glass fiber material, and resin with accelerator and catalyst, and preferably filler, whereupon dry sand is applied to the layer lying on the supporting foil, applying a second layer of glass fiber material, and resin with accelerator and catalyst, and preferably filler, to the sand layer, applying the decorative layer to the second layer, and then curing the supporting foil with the layers thereon while it continues its movement, preferably through a tunnel-type kiln equipped with temperature control means.

The manufacture of the panel takes place in a machine having a plurality of successive supply stations, a tunnel-type kiln following upon said stations, and means for continuously pulling a supporting foil through the machine and the kiln. In the first station, supply is effected of glass fiber material, preferably of the nonwoven type, and resin with accelerator and catalyst, and fine-grained filler. The proportion of resin to filler may preferably be 1:1. In the next station dry sand is dosed and in the following station there are applied further glass fiber material and resin with accelerator, catalyst, and fine-grained filler. By this arrangement of stations it is very simple, even during operation, to vary the ingredients in the different layers, should this be desired. The glass fiber reinforcement may be of different shape in the two layers, for instance a mat in the first layer, and chopped glass fibers in the second layer, which fibers have been supplied through a nozzle moving over the entire width of the supporting foil. If necessary, glass fiber fabric can of course be used in one or both layers. After the said three stations there follows one in which the decorative material is spread over the uppermost glass-fiber-reinforced layer, whereupon the supporting foil with the materials lying in layers of even thickness thereon is supplied to the kiln which preferably has both upper and lower heating or like means which are individually adjustable.

For economical reasons and for realizing low heat expansion and as insignificant an amount as possible of combustible material, it is imperative to keep the resin content as low as possible. The conventional procedure of first impregnating the sand layer and then mounting it between two fabric layers is disadvantageous because the resin is not capable of impregnating the fabric throughout. Also, in such a procedure, it is practically impossible to utilize the cheaper forms of reinforcing material, namely those of the nonwoven type. By instead applying the sand in the manner described in the foregoing an impregnation of the sand layer will take place from top to bottom. The advantage of two-layer dosing is that curing in each layer may be so adjusted as to occur at different rates, independently of each other, which implies a better control of the process. The method of the invention always ensures that the sand will be thoroughly impregnated throughout and that gelification commences at the right point of time. In addition, gelification can readily be so adjusted that an upper layer relatively rich in low viscous resin is retained simultaneously as the sand is low impregnated.

What I claim and desire to secure by Letters Patent is:

1. A method of manufacturing facing panels consisting of a glass-fiber-reinforced body and a decorative layer on said body, comprising applying a first layer of glass fiber material, and resin with accelerator and catalyst to a continuously moving supporting foil, applying dry sand to the layer lying on said supporting foil, applying a second glass fiber layer, and resin with accelerator and catalyst to the sand layer, placing the decorative layer on said second layer, and curing the layers lying on said supporting foil.

2. A method of manufacturing facing panels consisting of a glass-fiber-reinforced body and a decorative layer on said body, comprising applying a first layer of nonwoven glass fiber material, and resin with accelerator and catalyst and filler to a continuously moving supporting foil, applying dry sand to the layer lying on said supporting foil, applying a second layer of nonwoven glass fiber material, and resin with accelerator, catalyst, and filler to said sand layer, placing the decorative layer on said second layer, and curing the layers lying on said supporting foil.

3. A method of manufacturing facing panels consisting of a glass-fiber-reinforced body and a decorative layer on said body, comprising applying a first layer of nonwoven glass fiber material, and resin with accelerator and catalyst and filler to a continuously moving supporting foil, applying dry sand to the layer lying on said supporting foil, applying a second layer of nonwoven glass fiber material, and resin with accelerator, catalyst, and filler to said sand layer, placing the decorative layer on said second layer, and curing the supporting foil with the layers thereon while it moves through a tunnel-type kiln equipped with temperature control means.